July 7, 1959 L. C. McNUTT 2,894,111
PIPE WELDING APPARATUS
Filed March 26, 1957 5 Sheets-Sheet 1

INVENTOR
LOUIS C. McNUTT
BY: *A. D. T. Libby*
ATTORNEY

July 7, 1959    L. C. McNUTT    2,894,111
PIPE WELDING APPARATUS
Filed March 26, 1957    5 Sheets-Sheet 3
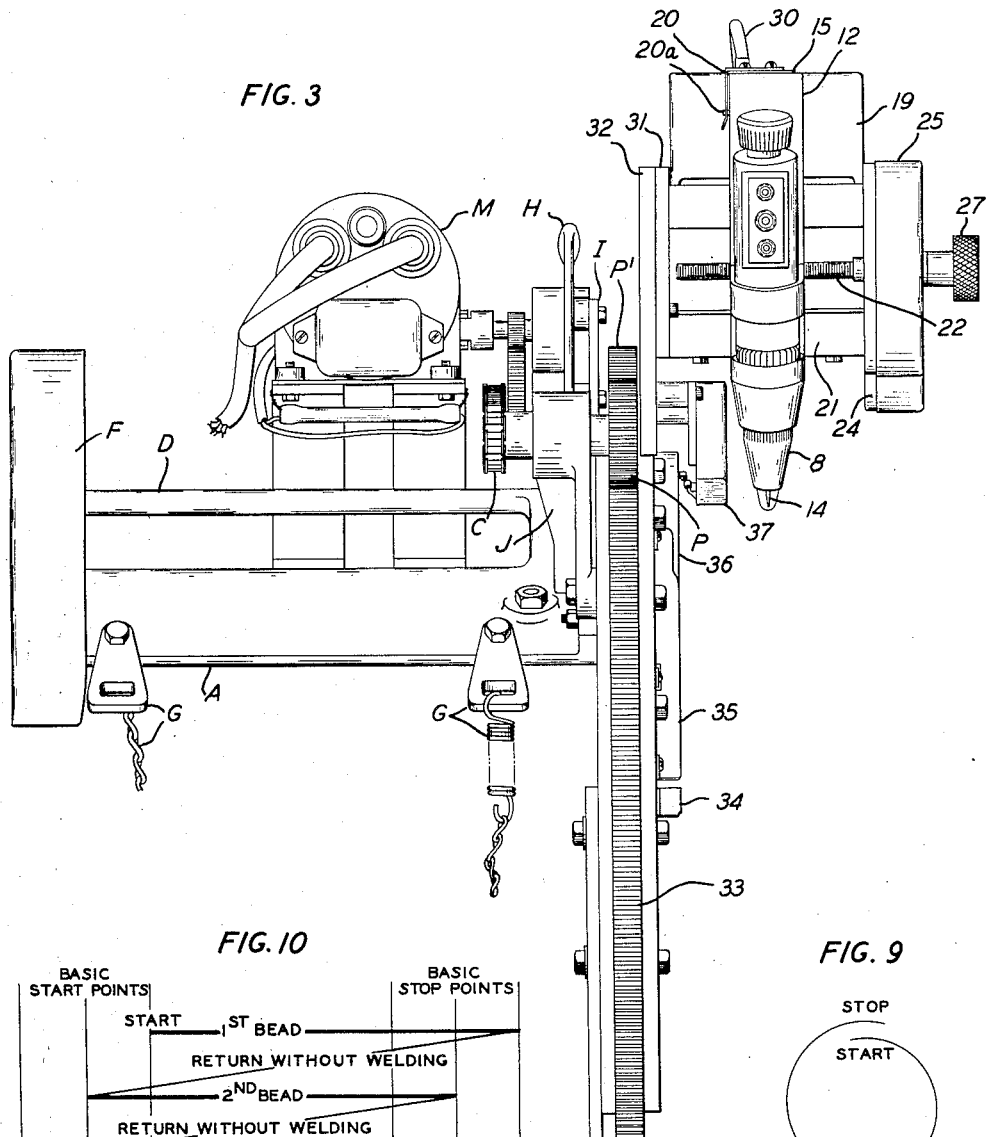
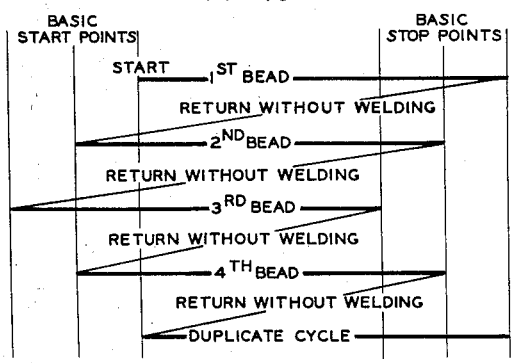
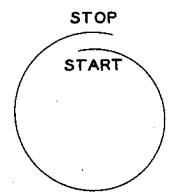
INVENTOR
LOUIS C. McNUTT
BY: *A. D. T. Libby*
ATTORNEY July 7, 1959 L. C. McNUTT 2,894,111
PIPE WELDING APPARATUS
Filed March 26, 1957 5 Sheets-Sheet 4
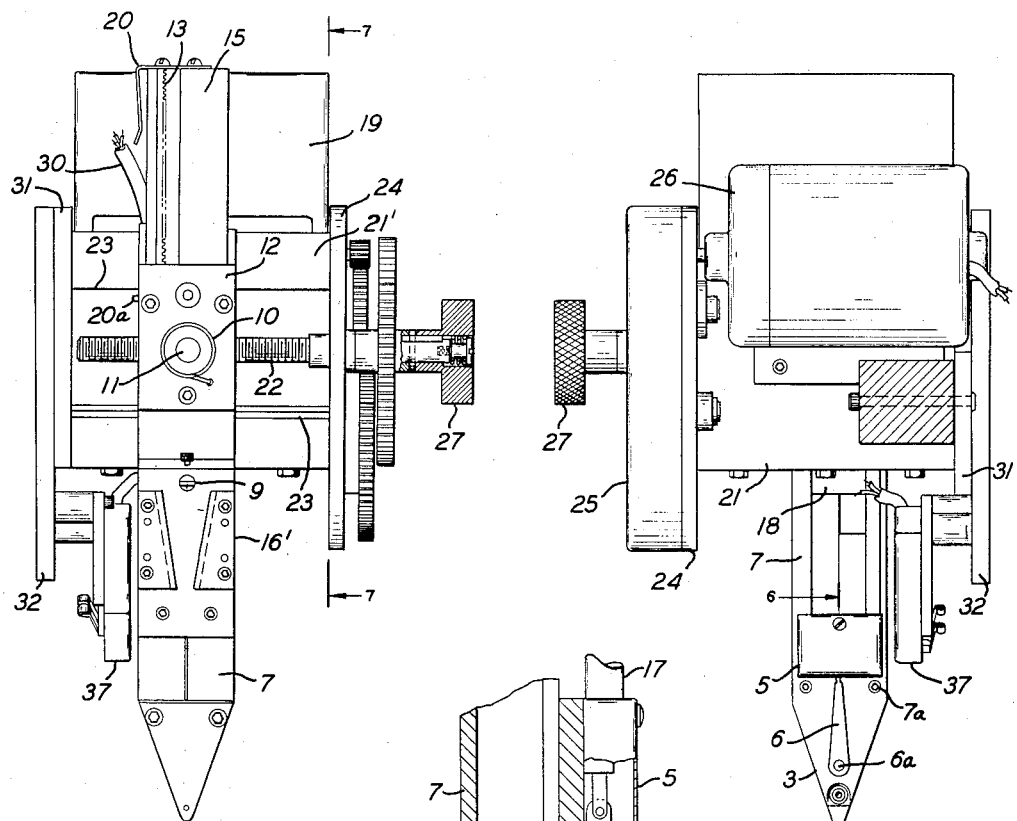
FIG. 4
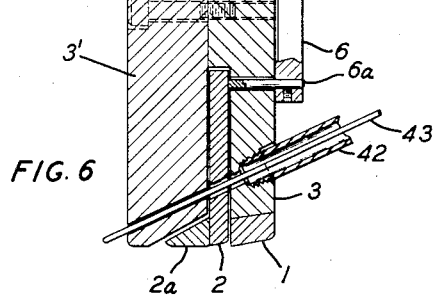
FIG. 6
FIG. 5
INVENTOR
LOUIS C. McNUTT
BY: A. D. T. Libby
ATTORNEY July 7, 1959  L. C. McNUTT  2,894,111
PIPE WELDING APPARATUS
Filed March 26, 1957  5 Sheets-Sheet 5

INVENTOR
LOUIS C. McNUTT
BY
ATTORNEY

United States Patent Office 2,894,111
Patented July 7, 1959

2,894,111

PIPE WELDING APPARATUS

Louis C. McNutt, West Chester, Pa.

Application March 26, 1957, Serial No. 648,537

19 Claims. (Cl. 219—60)

In my application Serial No. 412,299, filed February 24, 1954, I have shown and described an automatic pipe welding apparatus. In this pending application, I have pointed out wherein it has been the general practice in years past in welding together two pieces of pipe, to use internal back rings around the area of the two pipe ends that are to be welded together. In said application I have shown and described a new method of procedure without the use of backing rings. In this application I have pointed out many advantages derived from the new mechanism, and its method of procedure. From the knowledge gained by the construction and use of the equipment set forth in said application and from further and intense study of the problems involved in welding large pipe used in many constructions, such as is found in present day power plants, by way of example, I have found out how to make the welding apparatus to be herein described more nearly automatic and efficient in its operation.

In the drawings forming a part of this present application Figure 1 is a top plan view on a reduced size of the structure with one of the extending end members X being broken off and shown just below the broken off end.

Figure 3 is a side view of the structure looking at the left side of Fig. 1.

Figure 4 is a view on the line 4—4 of Fig. 1 with the case housing set of gears removed.

Figure 5 is an enlarged view on the line 5—5 of Fig. 1.

Figure 6 is an enlarged view on the line 6—6 of Fig. 5.

Figure 9 shows a transverse of beads around a pipe and of an overlapping that takes place.

Figure 10 shows diagrammatically the start and finish of each welding bead as it is laid down shown in Fig. 9.

Figure 1:
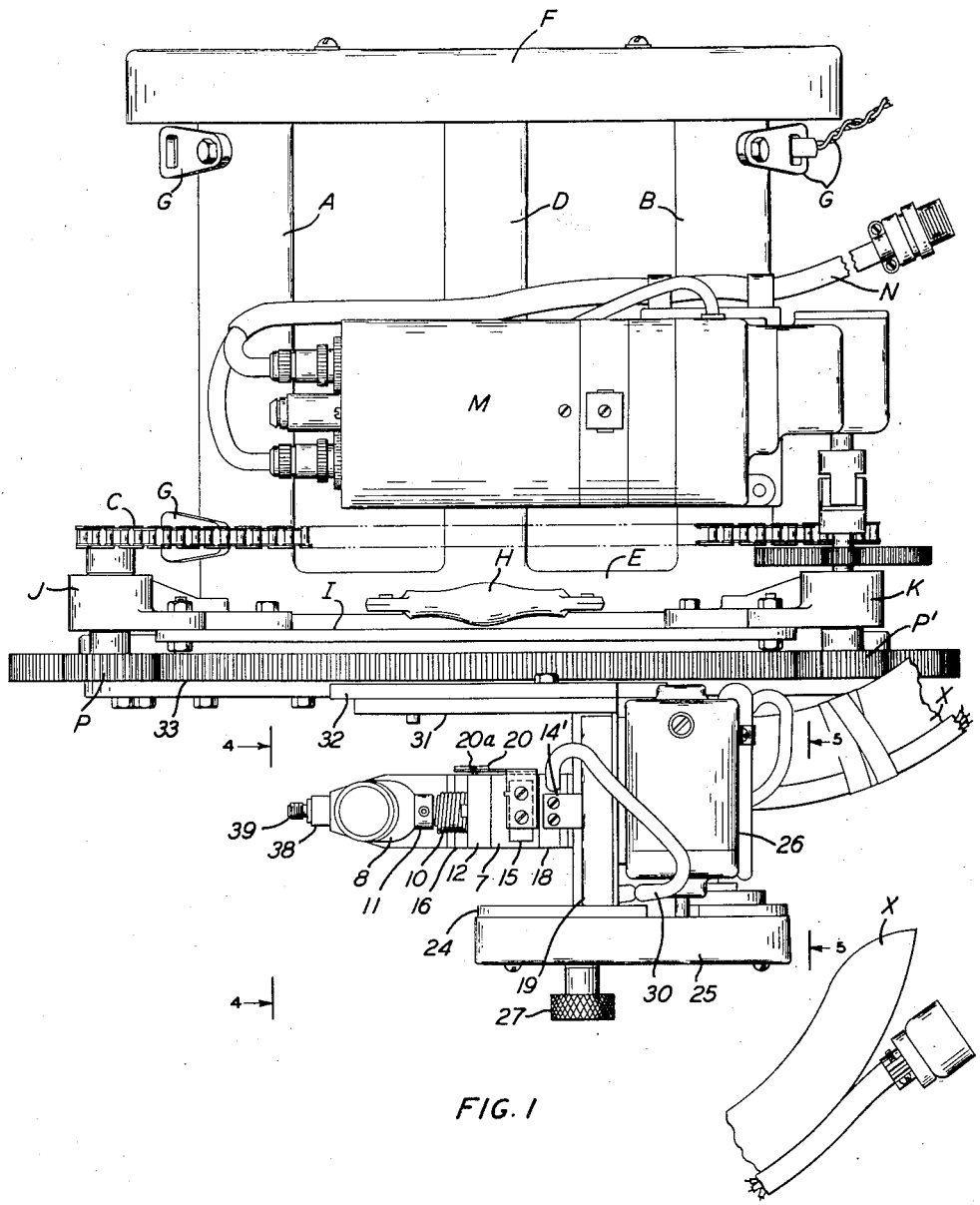

In the drawings F is a rear arcuately formed member engaging the pipe on which the structure is to be mounted. A, B and D are longitudinal frame members connecting the frame member E with the frame member F. To the frame supporting members A and B are attached a plurality of binding links and chains G for fastening the structure to the pipe that is to be welded. H is the handle fastened to the framework for the purpose of carrying and handling the welding unit. Adjacent the handle H is a cross-bar I which helps to support the members J and K, each of which carries a shaft with pinions P and P' which are in engagement with a welding gear to be later described. Each of the shafts carried by the members J and K also carry small gear wheels on which a drive chain C is carried. M is the main drive motor for driving the chain C and its associated pinions P and P' for turning the welding gear wheel to be later described. The motor M is supplied with alternating current by a power supply cable N. Carried on the projection, interiorly from the inside of members A, B and D are studs S, Fig. 2, preferably having serrated ends to engage the outer circumference of the pipe to be welded.

Figure 2:
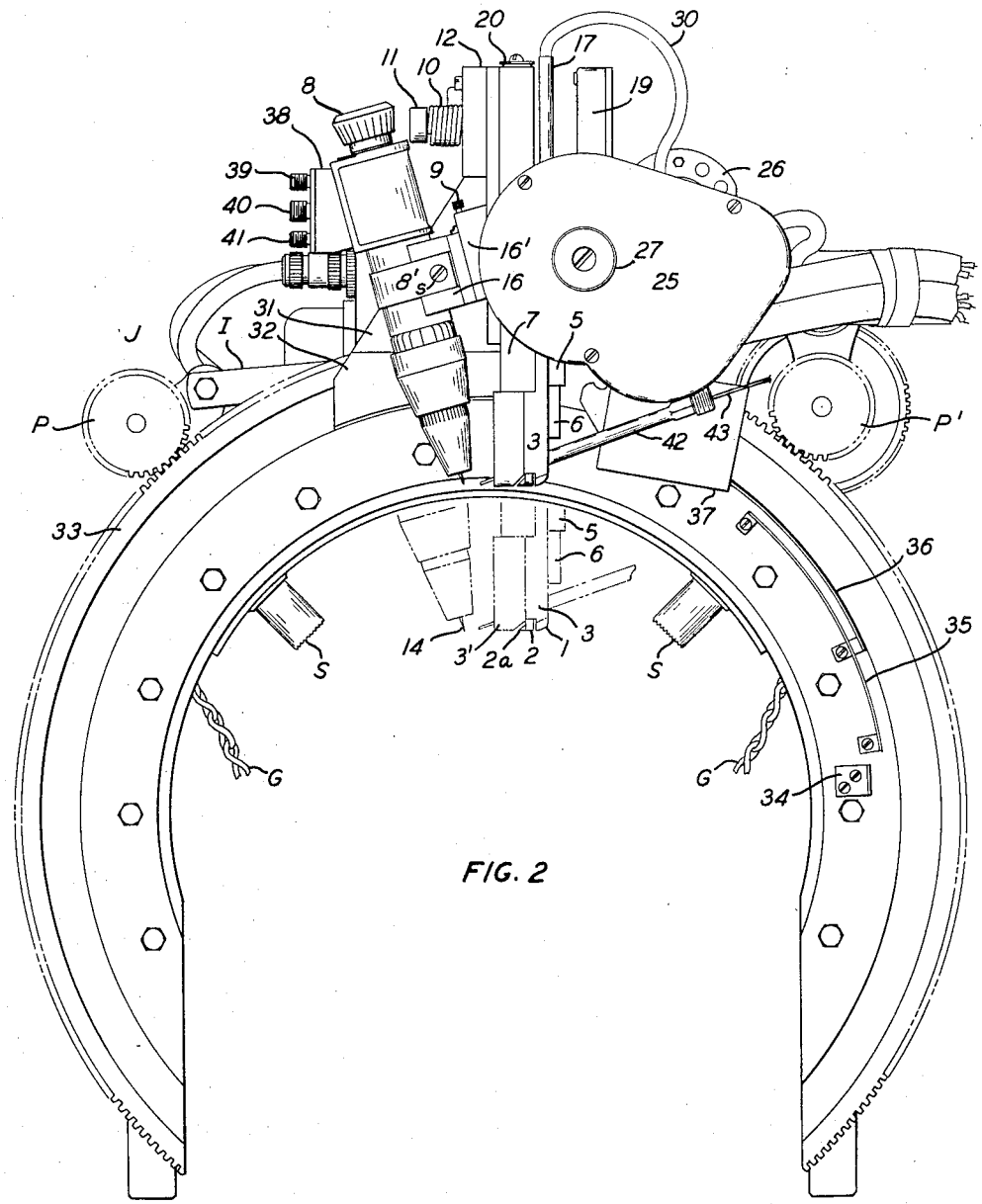
Figure 2 is a front view of the structure shown in Fig. 1 looking directly at the gear operating wheel.

Referring now to the details of my present invention, 1 is a tungsten carbide tip that is carried by the carbon steel shoe 3 that rides on the pipe to be welded to maintain a constant arc from the tungsten electrode 14 that is carried by a member to be later described. 2 (Fig. 6) is a sensing movable member, which upon contact with the side wall of the welding groove, controls automatically the placement of the welding beads regardless of the width or contour of the welding curve. This is done through the means of limit switches carried within the container 5 (Fig. 6) through the arm 6 having a pivot stud 6a, Fig. 6, that is connected at the upper end of the sensing mechanism 2 as shown by the dotted lines within the inner periphery of the gear wheel and its carrying plate (Figs. 2 and 6). The dotted lines indicate the position of these members when in welding position. The lower end of the member 2 has an outwardly projecting slightly movable end 2a of tungsten carbide (Fig. 6). 7 is a movable frame member to which the parts 1–6 just described are attached by one or more screws 7a. Attached to member 7 is a torch unit 8 (Figs. 2 and 7) fastened thereto by a clamp 8' and a screw s. The member 16 to which the clamp 8' is fastened has an arcuately tapered gib for fitting into a tapered slot in a part 16', Fig. 2, that is part of member 12 which forms a part of another member to be presently described. The taper portions 16 and 16' are locked in operative position by a locking member 9 having a push button for releasing the lock 9 for moving the gas torch 8 from the movable frame members 7 and 12. The member 7 is under constant tension against the weld through the means of a triple wound spring 10 supported on shaft 11 which enters the casing 12 for operating the gear rack 13, Fig. 4, which is mounted on a housing 15 containing a plurality of ball bearings of which, there is utilized in the structure that I found satisfactory, twelve sets of ball bearings to support thrust in all directions of the movable frame 7 as this is propelled vertically and horizontally in the operation of producing a weld. Each set of ball bearings is preferably eccentrically mounted for an alternating load and allowed to take up for wear. Attached to the top of member 15, there is fastened a resilient member 20 formed and positioned so the hole 20' therein will receive a stud or member 20a on the side of member 12 to hold the movable frame 7 and all its associated parts in a raised or nonworkable position, while transferring the apparatus from one place to another.

Figures 7, 8:
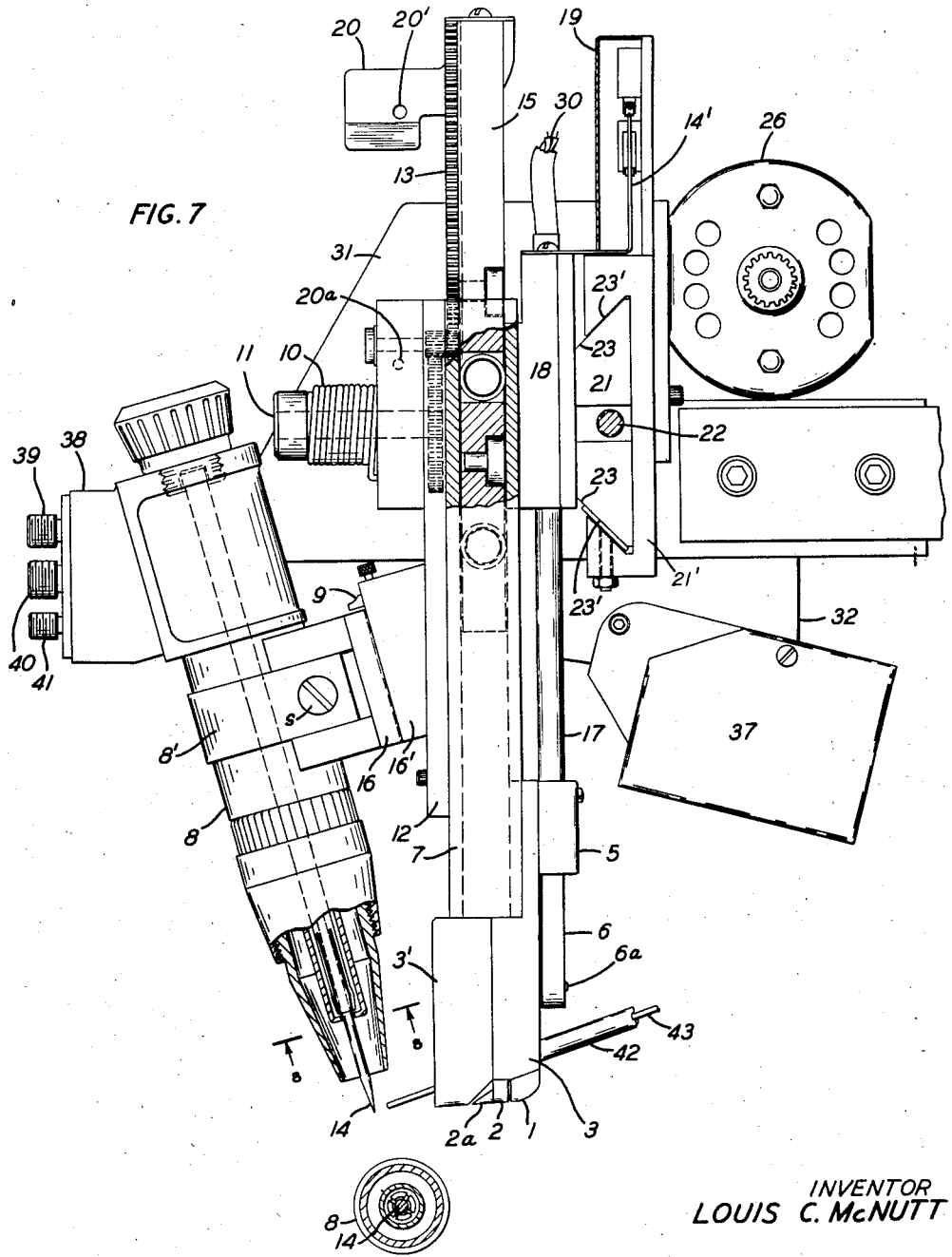
Figure 7 is a much enlarged view on the line 7—7 of Fig. 4.
Figure 8 is a view on the line 8—8 of Fig. 7.

Back of this housing and support member and adjacent the rear of the movable part 12, is a member 18, Figs. 1 and 7, which supports a hollow protective tube 17 that carries a current conduction cable 30 to the unit switch 5 that is operated by the arm 6 as stated. The member 18 has a projecting part 21 which forms a rear support for member 18. The member 21 has V-shaped parts 23 on opposite ends to engage cooperative recesses 23' on member 21', when the member 21 moves on the turning of the screw 22. Extending between a frame mounting plate 31 and the gear plate 24 is a screw shaft 22 which passes through between the opposite parts 23 of member 21. With this arrangement, the motor 26 can be operated to drive shaft 22 to locate the welding arc at a desired transverse point. The shaft 22 may be operated by a spring latch knob 27 by disengaging it first from the drive coming from the gearing within the casing 25 and which is connected to the motor 26.

Since the amount of horizontal movement is electrically controlled through the sensing mechanism as described, including appropriate time means, each succeeding welding bead is arcuately placed for producing a finished weld of good contact.

19 is a case containing three limit switches automatically operated at the proper time by a member that is operatively connected to the switch member 14', which acts to control a welding operation so as to fill the groove to be welded in properly spaced adjacent layers.

31 and 32 are assembly mounting means for rotatably carrying the split ring gear 33. Referring to Fig. 2, it will be seen that the gear unit 33 carries a small cam 34 for actuating a stepper switch on the return movement of the welding head. This actuation is accomplished by automatically depressing a momentary contact switch which may be placed in a box having a cover 37, and upon its depression, the stepper switch, which is a heavy duty multiple-type telephone relay in a control circuit, moves one set of contact points around on its circumference bringing electrically into an operational position variously described electrical timers. 35 is a cam for the controlling operation of a normal open contact switch which may also be placed in the switch box 37. This switch, while depressed, allows the necessary amount of travel along its circumference to stagger the stopping points on the four basic welding beads, starts and stops. The cam 36 (Fig. 2) is for controlling the operation of the starting points as shown in Fig. 10. From this figure and Fig. 9 which speaks for itself, it will be seen that the welding beads are automatically staggered and overlapped so that, what I term a perfect weld is automatically obtained with this new pipe welding apparatus.

It is to be understood that the torch unit 3 is no direct part of my present invention as this is a unit which is purchased for use in connection with my invention. As shown in Fig. 7, unit 8 has a block 38 preferably of strong insulating material which carries three threaded members 39, 40, 41. To the member 39 is connected a tube, preferably flexible for carrying an inert gas down through a suitable passageway to the electrode end 14. The member 40 is so constructed as to receive an electrical conductor to carry welding current to the contact 14 and also cooling water is supplied through the water inlet connector 41 and returned around the electrical conductor. Since these three elements and associated parts form no part of my invention, further description does not seem to be necessary.

A suitable conductor 42 brings the welding wire 43 to a welding position as shown in Figs. 6 and 7. The welding wire for this kind of work is approximately one-sixteenth of an inch in diameter so that it can be moved readily around in a loop as the welding wheel turns. It may be noted that after one bead is laid down the welding wheel 33 is moved back to a new starting position, not slower than 1–3 seconds.

While I have shown a tungsten carbide tip 1 on section 3, a somewhat like tip may be used at the free end of the member 3' adjacent the free end of the welding electrode 43 which acts with the electrode 14 to produce a welding deposit.

While many of the details are described, it is obvious that numerous changes can be made, without departing from the spirit of my invention and the scope of the appended claims.

What I claim is:

1. A welding structure for welding large pipes together, comprising a gear wheel having an opening large enough to pass the gear wheel into welding position around the pipe, means for holding the structure securely to the pipe, said means including an arcuately formed framework to fit onto the pipe with means for anchoring it to the pipe, gear means carried by said framework and having parts to drivingly engage said gear wheel and move it around the pipe, an electric motor for operating said gear means, and mechanism carried by the gear wheel for holding a tungsten electrode in arc position and further mechanism carried by the gear wheel for carrying a welding rod into arc operative position with said tungsten electrode and means for automatically changing the starting and stopping place of the welding arc wherein the material as it is applied to the pipe joint will follow a predetermined overlapping plan.

2. A welding structure as set forth in claim 1 further defined in that said welding rod is passed through a member having a tungsten carbide tip that rides on the weld as it is made.

3. A welding structure as set forth in claim 1 further defined in that said welding rod is passed through a sensing device which includes a member for contacting the side walls of a welding groove whereby the placement of metal in the welding groove is controlled.

4. A welding structure as set forth in claim 1 further defined in that said welding rod is passed through a sensing device having a movable member terminating in a tip of tungsten carbide or equivalent as and for the purpose described.

5. A welding structure as set forth in claim 1 further defined in that the welding rod is carried by parts that can be readily adjusted so that a constant arc voltage is obtained.

6. A welding structure for welding large pipes together, comprising a gear wheel having an opening large enough to pass the gear wheel into welding position around the pipe, means for holding the structure securely to the pipe, said means including an arcuately formed framework to fit onto the pipe with means for anchoring it to the pipe, gear means carried by said framework and having parts to drivingly engage said gear wheel and move it around the pipe, an electric motor for operating said gear means, and a mechanism supported on the gear wheel for carrying a fixed electrode and a movable electrode to cooperate to form a welding arc, both electrodes being mounted in holders that are simultaneously adjustable in a direction of the pipe to match the width of the groove weld.

7. A welding structure as set forth in claim 6 further defined in that the fixed electrode is tungsten carried in an independent holder while the movable electrode is of welding metal and carried in its holder which has a part that rides on the weld.

8. A welding structure as set forth in claim 6 further defined in that said adjustment of the electrode holders is preferably done by a small independent motor through a suitable gear arrangement.

9. A welding sructure as set forth in claim 6 further defined in that said adjustment of the electrode holders can be made by a hand operated device which disconnects the motor and interconnected gears.

10. A welding structure as set forth in claim 6 further defined in that the fixed electrode is tungsten carried in an independent holder that is readily removably carried in a member that forms part of the means that carries the movable electrode.

11. A welding structure for large pipes including a ring gear with an opening large enough so the gear can be slipped over the pipe with means for mounting it on the pipe, said ring gear carrying a compound unit made up of two interlocking parts, one part carrying a tungsten electrode in arc position while the other part carries a welding wire with means for feeding it to arc position with said tungsten electrode, together with means for applying pressure to the parts carrying the welding wire and means for adjusting the said unit longitudinally of the pipe to get a lateral interlocking of the welding beads as made by the welding electrodes.

12. A welding structure as set forth in claim 11 further defined in that the part carrying the tungsten electrode, has means for feeding an inert gas around the tungsten electrode.

13. A welding structure as set forth in claim 11 further defined in that the part carrying the tungsten electrode, has means for feeding an inert gas around the tungsten electrode, and also has means for carrying electric current to the tungsten electrode and a cooling fluid, such as water, around the current carrying means and for taking care of the cooling fluids.

14. A welding structure as set forth in claim 11 further defined in that the unit part carrying the welding wire is made up of several parts, one of which is mounted to move up and down on a normally vertical member to a lockout device at the top of the vertical member as described.

15. A welding structure as set forth in claim 14 further defined in that the member carrying the lockout device also carries a gear rack for use in moving the compound unit up and down.

16. A welding structure as set forth in claim 14 further defined in that the member carrying the lockout device also carries a gear rack and a plurality of ball bearings in combination with a plural wound spring on a drive shaft to act on said bearings to apply pressure to the parts carrying the welding wire.

17. A welding structure as set forth in claim 11, further defined in that the unit part carrying the welding wire has one of its main supporting parts mounted to move up and down on a fixed vertical member, which is interconnected with means that are fastened to, and arcuately travel with, the main welding gear wheel, and further defined in that means are provided for transversely moving the said fixed vertical member, along with the parts carried thereby, whereby the placement of the metal in the welding groove is controlled.

18. A welding structure as set forth in claim 11, further defined in that the welding wire is fed into welding position by use of a compound sensing means carried on the lower end of the said part together with electrical switches operated by the sensing means.

19. A welding apparatus having a ring gear wheel with an opening large enough so the gear can be slipped over the pipe to be welded to another pipe, said gear wheel carrying apparatus which will operate automatically to automatically produce a weld made up substantially of over-lapping and staggered layers, as and for the purpose defined herein.

References Cited in the file of this patent

UNITED STATES PATENTS

| | | |
|---|---|---|
| 1,949,251 | Gilbert | Feb. 27, 1934 |
| 2,013,630 | Goldsborough | Sept. 3, 1935 |
| 2,068,166 | Dodge | Jan. 19, 1937 |
| 2,360,160 | Pickhaver | Oct. 10, 1944 |
| 2,644,070 | Herbst | June 30, 1953 |
| 2,719,899 | Schwarting | Oct. 4, 1955 |
| 2,721,248 | Kirkpatrick | Oct. 18, 1955 |